May 17, 1966 R. W. BEALL, JR., ETAL 3,251,510
DISPENSING CARTON
Filed July 31, 1964 4 Sheets-Sheet 1

INVENTORS
RICHARD W. BEALL, JR.
ERNEST C. PELLATON.
CLYDE E. STRAHL.

BY
ATTORNEY

May 17, 1966  R. W. BEALL, JR., ETAL  3,251,510
DISPENSING CARTON
Filed July 31, 1964 4 Sheets-Sheet 2
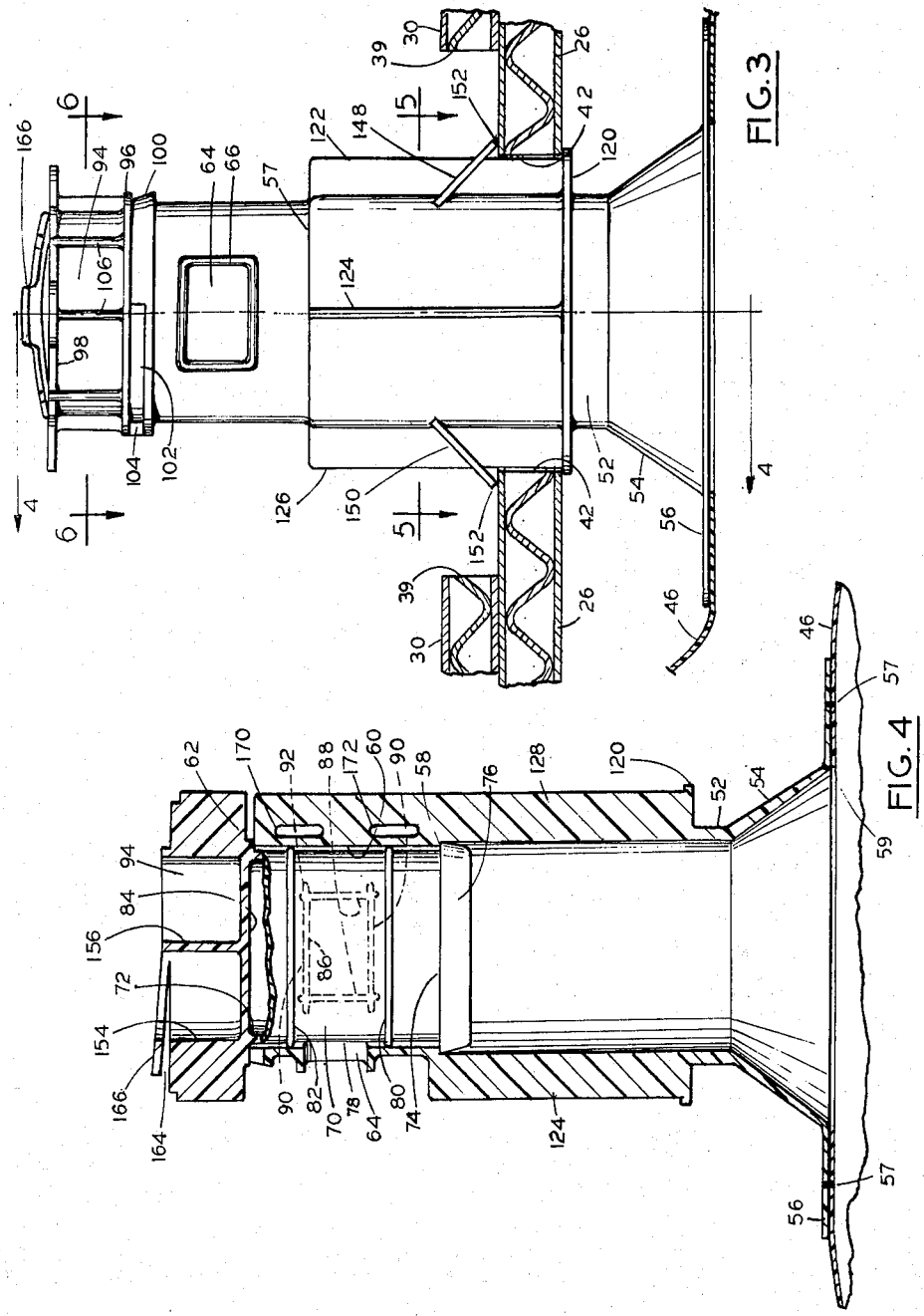
INVENTORS
RICHARD W. BEALL, JR.
ERNEST C. PELLATON.
CLYDE E. STRAHL
BY
ATTORNEY May 17, 1966  R. W. BEALL, JR., ETAL  3,251,510
DISPENSING CARTON Filed July 31, 1964  4 Sheets-Sheet 3

INVENTORS
RICHARD W. BEALL, JR.
ERNEST C. PELLATON.
CLYDE E. STRAHL.

BY *P. P. Keeper*
ATTORNEY

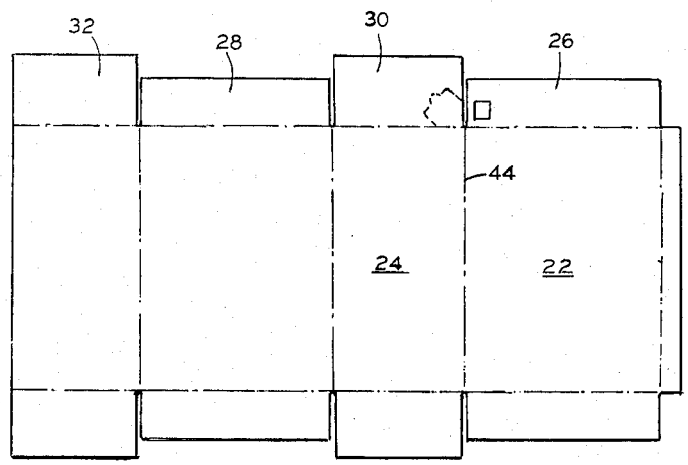
FIG. 10
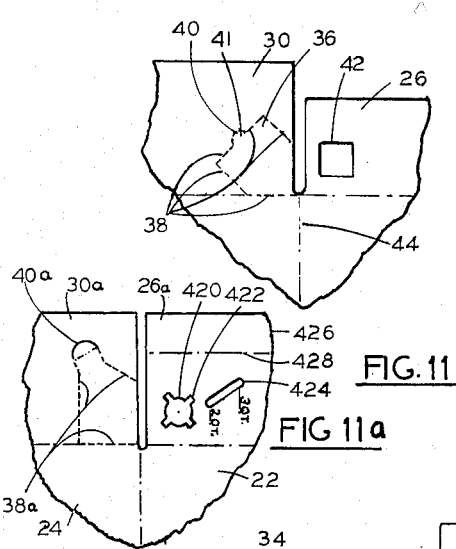
FIG. 11
FIG. 11a
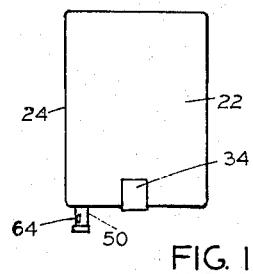
FIG. 12
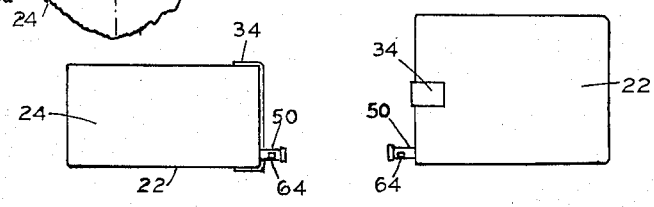
FIG. 14
FIG. 13
INVENTORS
RICHARD W. BEALL, JR.
ERNEST C. PELLATON.
CLYDE E. STRAHL.
BY
ATTORNEY

United States Patent Office 3,251,510
Patented May 17, 1966

3,251,510
DISPENSING CARTON
Richard W. Beall, Jr., Manhattan Beach, and Ernest C. Pellaton, Larkspur, Calif., and Clyde E. Strahl, Greenfield, Ind., assignors to Inland Container Corporation, Indianapolis, Ind., a corporation of Indiana
Filed July 31, 1964, Ser. No. 386,634
9 Claims. (Cl. 222—183)

This invention is directed to liquid dispensing containers of the type employing fiberboard cartons and thin plastic liners.

The packaging, distribution and dispensing of liquids such as milk, drinking water and the like, in corrugated cartons having impervious plastic liners, for example as shown in U.S. Patent No. 3,007,608, and the filling of such lined cartons through a tube affixed to the liner, by first evacuating the liner, and filling through the tube under pressure, for example, as shown in U.S. Patent No. 3,108,901, has become common practice. Such cartons, generally speaking have been a relatively large capacity, such as 3 to 5 gallons capacity, and the cartons after filling are transported preferably under refrigeration, and dispensing of the contents has been effected while stored in refrigerators designed to receive two or more of such cartons. The cartons on being placed within such refrigerators are inverted for dispensing through the fill tube, the latter being controlled as by a pinch valve associated with the refrigerator and acting on the tube after the tube is brought out through an aperture in the lower part of the refrigerator. The tube end, immediately after filling, is sealed with a cork or plug. After threading the tube through the pinch valve at the refrigerator destination, the free end of the tube is unplugged or sliced off as desired. There after flow is controlled by the pinch valve. While the foregoing practice has had wide acceptance for the dispensing of milk in restaurants and the like, the domestic use of such containers in the home has been somewhat confined to the situation where a separate refrigerator designed for the purpose is provided.

The present invention is directed to the application of the foregoing principles to a package capable of use within the usual domestic refrigerator. It is directed to a container of such dimensions as to enable the same to be stored in such a refrigerator while lying on either its broad or narrow sides, or up-ended, the container being adapted for dispensing from any one of such positions through a spout and valve forming a part of the package assembly.

More particularly the invention is directed to a container whose base is preferably rectangular to afford different shelving opportunities while lying on either of its sides, and a dispensing spout located in a corner to afford gravity dispensing while lying on either side or while up-ended. The spout, secured to the impervious liquid container liner within the carton is adapted to be protected when stored within the package after filling and during transportation, and adapted to be readily withdrawn from the container for dispensing, without opening of the container flaps. Such spout is adapted, when stored or withdrawn, to be suitably oriented whereby the discharge orifice of the spout is effective to discharge the contents of the package when lying on either side or up-ended, and the spout is provided with a manually operated valve in the form of a plug which upon rotation within the spout, cuts off or permits flow through the orifice.

The invention further has to do with a spout and valve structure comprising a tubular spout of plastic having a flange for bonding to a plastic liner, and a plug for the spout, which by rotation acts as a valve as well as a plug when inserted into the spout. The structure comprises but two parts readily molded of plastic, and of a design to promote sanitation. The spout when bonded to a liner may be plugged under sanitary conditions, and the valve discharge orifice may be subsequently employed both for filling and subsequent dispensing, or the liner filled through the spout before insertion of the plug.

The package assembly with its spout and valve are so constructed, as to readily prepared for dispensing by breaking out a small section of an outer carton flap, whereupon the dispensing valve spout is readily lifted manually to dispensing position from its seated position on the inner flap, and when so lifted, it is held and locked to the inner flap with its discharge orifice so oriented with respect to the carton, as to provide for discharge from the carton assembly when lying on either side or up-ended.

The above and other novel features of the invention will appear more fully hereinafter from the following detailed description when taken in conjunction with the accompanying drawings. It is expressly understood that the drawings are employed for purposes of illustration only and are not designed as a definition of the limits of the invention, reference being had for this purpose to the appended claims.

In the drawings wherein like reference characters indicate like parts:

FIGURE 3 is an enlarged sectional view taken substantially on the line 3—3 of FIGURE 1 with the spout shown in front elevation, and supported in raised or extended position on the inside carton flap;

FIGURE 4 is a sectional view of the spout taken on the line 4—4 of FIGURE 3;

FIGURE 10 is a plan view of a carton blank;

FIGURE 11 is an enlarged fragmentary portion of FIGURE 10;

FIGURE 11a is a modification of FIGURE 11;

FIGURES 12, 13 and 14 are side elevational views of a carton as it might lie on a refrigerator shelf, in up-ended position, lying on its narrow side, or lying on its broad side, respectively.

Figure 1:
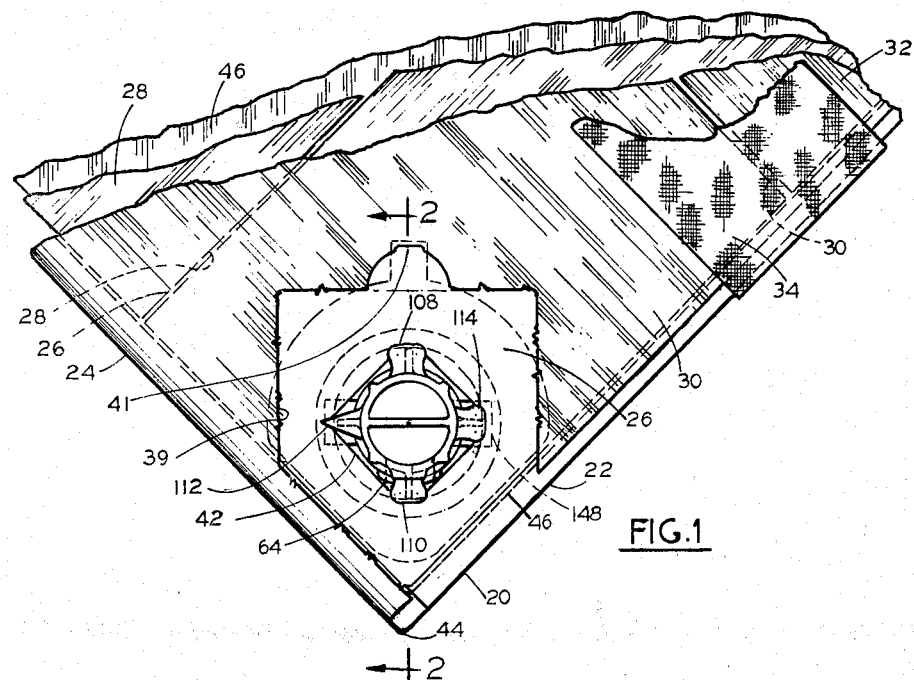
FIGURE 1 is a fragmentary view of a corner of the top of a carton with a tearout section removed, and parts broken away.

Referring to FIGURE 1, there is shown the top corner 44 of a carton of corrugated fiberboard 20 with the filling and dispensing spout and valve retracted. The fiberboard is treated to render the surfaces water resistant so that condensate will not affect the strength of the carton. Such carton, to hold 10 quarts, may have external dimensions in the order of six by nine inches by twelve inches high. The base dimensions may be alter to render the carton capable of disposition between adjacent refrigerator shelves when either lying on its broad side or its narrow side. On the other hand the carton may be positioned upside down, it being understood that the carton is intended to be capable of dispensing the major portion of its contents while in any one of the three positions.

The carton comprises broad and narrow side walls 22, and 24 respectively, inner flaps 26 and 28 and outer flaps 30 and 32, the latter meeting beneath the gummed tape sealing strip 34, when the carton is readied for shipment in filled condition. The top flap may have a tear out piece 36 (removed in FIGURE 1) defined by perforations 38, and a cut out finger tab 40, severed by a semicircular cut 41, which when manually pulled, readily results in the severing of the remainder of the tear out piece 36 from the flap 30, to provide an access aperture 39 and expose the inside flap 26. The inside flap 26 is provided with a square aperture 42, centrally disposed with respect to the aperture 39 formed in the outer flap by the removal of the tear out piece 36, the aperture 42 being located on a 45° diagonal from and as near the corner 44 as practical and preferably equally distant from the carton sides 22 and 24. Within the carton is a thin wall liquid tight plastic bag 46, the dimensions of which equal or exceed the internal dimensions of the carton 20, so that the bag when filled to the desired extent fills out against the internal walls of the carton without stress. Such bag may be of two ply construction, comprising an inner tubular ply, and an outer wrap around ply heat sealed along a side edge, with both plies heat sealed together at top and bottom. Such a bag may be as shown for example in U.S. Patent No. 3,122,297, and the plies may be of polyethylene or other suitable material.

In order to facilitate filling of the bag, when placed within the carton, and also to facilitate dispensing from the carton, when up-ended, or lying on one side or the other, the bag is provided with a spout 50, the outer end of which is provided with a plug valve 70. Such spout, shown about double size in FIGURES 2, 3 and 4, comprises a molded cylindrical body portion 52 of polyethylene or the like, having a flare 54 at its lower end, which may be conical and gradually reducing in thickness, and a thin annular attachment flange 56, which is heat sealed as at 57 or otherwise secured around an aperture 59 formed in the bag wall. The aperture is so placed in the bag wall as to facilitate location of the spout 50 in the region of the corner of the carton provided with the tear out piece 36, and the square aperture in the flap 26, when closed, so that filling without stressing of the bag within the carton may be effected, and so that, as will later appear, the spout may be disposed within the carton after filling and during shipment and subsequently withdrawn to a dispensing position.

The spout has a slight abrupt reduction in internal diameter at 57 to form an internal shoulder at 58, and has a cylindrical internal surface 60 from the change in diameter 58 to its open end at 62. The spout has a rectangular pouring aperture 64 in one side, and an external rectangular lip 66 protruding from the wall around such aperture. Disposed within the spout is a hollow plug valve 70, formed of polyethylene or the like, and whose internal wall 72 is cylindrical. The plug valve 70 is adapted to be inserted into the end of the spout to close the same, and the lower end of the plug valve is provided with an external shoulder 74, and conical lead in surface 76, so constructed that when the valve is inserted into the spout, the shoulder 74 and conical surface 76 resiliently contract, and slightly yieldingly distend the internal wall 60 of the spout, and when inserted to the end position shown in FIGURE 4, the shoulder 74 expands to its relaxed diameter beneath the shoulder 58, and once the plug valve is inserted to such position, it cannot be removed from the spout.

The plug valve is provided on its exterior cylindrical surface 78, with annular sealing rings 80 and 82, one above, and the other below the aperture 64, and has a transverse wall 84 at its upper end. The plug valve is provided with a rectangular aperture 86 of the same size as the aperture 64, which apertures are adapted to be aligned when the plug valve is suitably rotated. The aperture 86 is provided with a sealing frame or bead on the exterior of the surface 78 of about the same radial height as the rings 80 and 82. The frame comprises elementally disposed ridges 88, and arcuate ridges 90, which preferably intersect at the corners to provide extended bearing points outside the frame as at 92, and the frame is adapted to make a complete seal against the internal wall of the spout and around the opening 64, when the aperture 86 and opening 64 are aligned.

The upper end of the plug valve is provided with an operating handle or knob 94, having an annular lower flange and upper flange 96 and 98 respectively. The lower flange bears against the end wall of the spout, the spout having an annular bead as at 100. An arcuate portion, of about 90 degrees in length of the upper end of the spout is removed as at 102, and depending from the flange 96 is an integral circumferentially narrow key 104 which extends into the arcuate area 102, and acts as a stop to prevent rotation of the valve plug in excess of about 90 degrees, the end limits of which comprise an end position of the valve with the apertures 64 and 86 perfectly aligned, and an end position of complete disalignment with the opening 86 sealed against the inside wall 60. A plurality of ribs 106 on opposite sides of the handle may extend between the flanges 96 and 98, and the upper flange may be extended to provide finger taps 108 and 110, and an arrow having a pointed head 112 and tail 114 is also provided, each of which may also serve as tabs. The arrow point 112 will be aligned with the center of the aperture 86, so as to serve as a means for apprising an operator of the position of the valve plug and its opening 86 with reference to aperture 64, and thus indicate valve open and closed positions.

On the lower portion 52 of the spout there is disposed a flange 120 from which extend radially and elementally disposed wings or ribs 122, 124, 126 and 128. Such ribs are equally spaced about the spout at angles of 90 degrees from one another and are of substantially uniform radial width, and the outer edges 132, 134, 136 and 138 define the corners of a square of a size substantially corresponding to the dimensions of the square aperture 42 in flap 26. Rib 124 terminates at the change of diameter at 58, while rib 128 extends to the upper end of the spout. While ribs 126 and 122 are indicated as like rib 124, they likewise may correspond to rib 128 and extend to the upper end of the spout. Rib 128, and ribs 126 and 122, if extended to the end of the spout, are preferably provided with stress relief apertures 170 and 172 in alignment with the bearing regions of the seal ribs 80 and 82 on the internal wall of the spout to avoid any tendency for the spout to distort out of round thereat.

The handle end of the plug valve is provided with two opposed wings or ribs 138 and 140, of a radial width corresponding to the width of the ribs 122, 124, 126 and 128, and when the valve is in closed position the rib 140 aligned with rib 128, and the distance between the outer edges 142 and 144 of the ribs 138 and 140 substantially corresponds to the diagonal of the square aperture 42 in flap 26.

Figure 2:
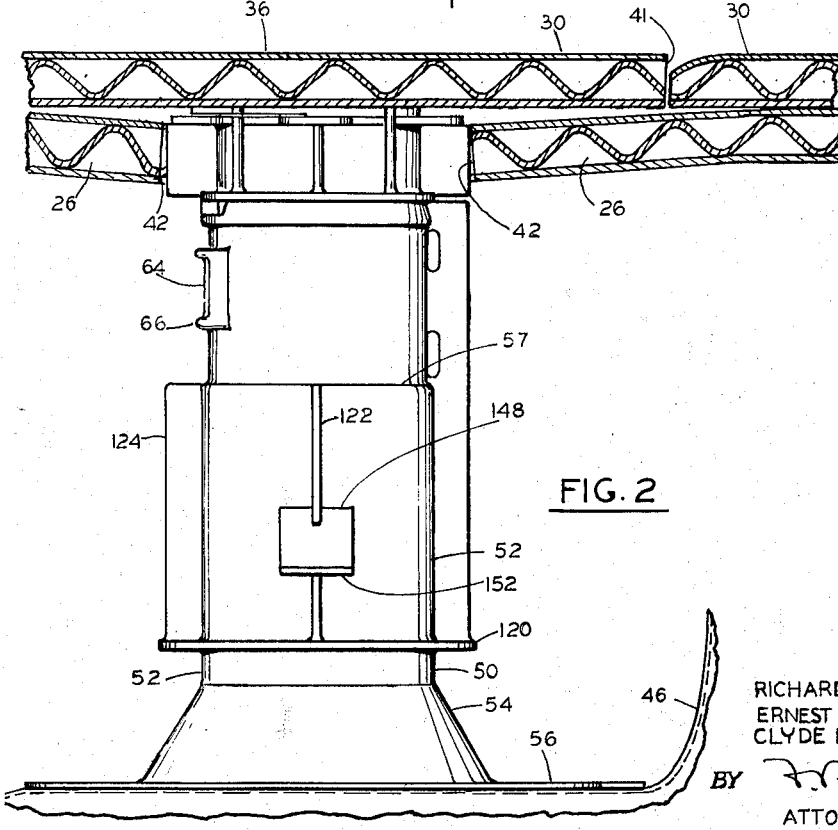
FIGURE 2 is an enlarged sectional view taken substantially on the line 2—2 of FIGURE 1, of a closed carton with the spout shown in side elevation.
Figure 6:
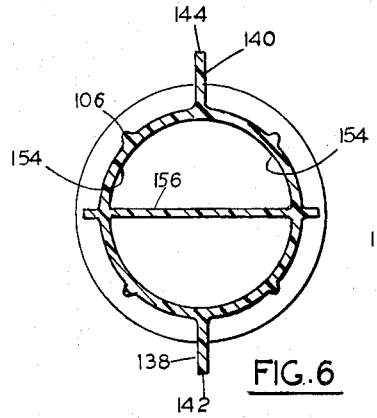
FIGURE 6 is a sectional view taken on the line 6—6 of FIGURE 3.
Figure 5:
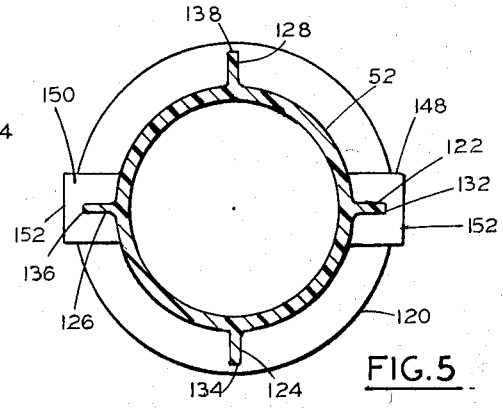
FIGURE 5 is a sectional view taken on the line 5—5 of FIGURE 3.
Figure 7:
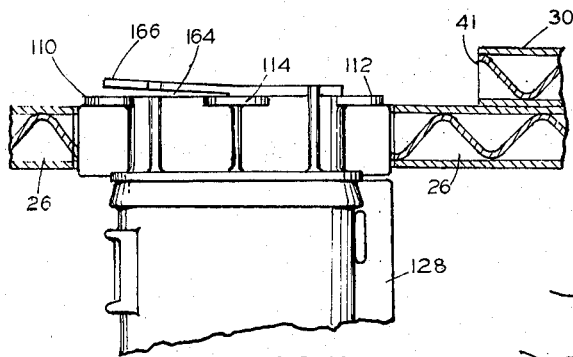
FIGURE 7 is a fragmentary side elevational view showing a lifting tab.
Figure 8:
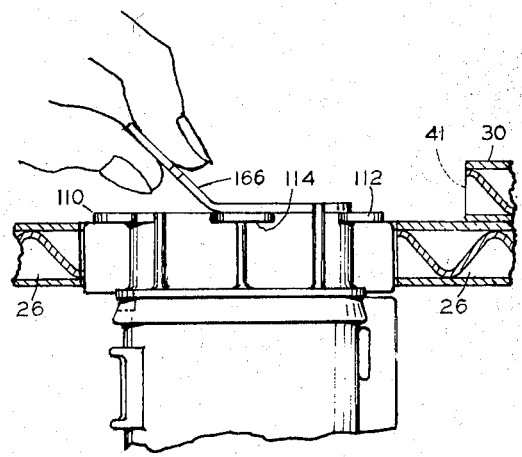
FIGURE 8 is a view similar to FIGURE 7 with the tab or bale hinged upwardly.

The spout is also provided with inclined resilient tab means 148 and 150 associated with ribs 122 and 126, the lower edges 152 of which are spaced above the flange 120 by a distance substantially the thickness of the corrugated fiber board of the cover flap 26. The spout and its valve cap, when the carton bag is filled with milk, is disposed with the valve head portion seated within the square aperture 42 of the flap 26, that is the flange 96 is below the flap, and the tabs 108, 110 and arrow head and tail 112 and 114 are above the flap 26, and the outer flap 30 is disposed over the tab ends of the valve cap handle all as indicated in FIGURE 2. The valve will be in closed position, and the ribs 138 and 140 will be disposed diagonally within the opening 42, and the ribs 128 and 140 will be diagonally directed away from, and the ribs 124 and 138 directed toward the corner 44 of the carton.

When the carton reaches its destination for dispensing, the tear out piece 36 is removed, the valve head and spout lifted through the square aperture 42, until the edges 152 of the inclined tabs 148 and 150 spring through the aperture 42 whereupon the spout and valve are held in elevated position, with the discharge orifice aimed in the direction of the corner 44 of the carton, as indicated in FIGURE 3.

Thereafter, the carton can be laid on either of its sides, or up-ended, and the liquid contents of the package discharged at will, by manipulation of the valve as desired, as is shown in FIGURES 13, 14 and 12.

Figure 9:
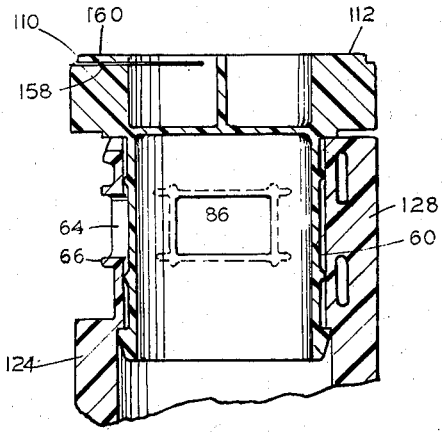
FIGURE 9 is a sectional view illustrating an alternate form of tab or bale.

In order facilitate lifting the valve assembly from its packaged position with the tabs 108 and 110 lying flat on the outer surface of the flap 26 the tubular section 154 of the valve plug handle, with its transverse rib 156, may be transversely sliced beneath one of the tabs as at 158 in FIGURE 9 to approximately the rib 156 so that the tab 108 may become a handle bale 160 and be lifted out of the plane of the end of the plug and gripped between the fingers, so that the assembly can be readily lifted to a position where the entire assembly can be grasped, or the end of the tubular section 154 may be extended slightly beyond the plane of the tabs as at 162 and a similar nearly semi-circular portion of the extension sliced as at 164 to provide a small finger handle or bale 166, which is the form of the invention as is illustrated in FIGURES 1 to 4, 7 and 8.

While reference to a 10 quart container with dimensions in the approximate ratio of 2:3:4 has been made, it will be appreciated that a container of such size may be about as large as can be conveniently placed within the usual domestic home refrigerator of the nominal 12 to 14 cubic foot size, and smaller containers, or even a ten quart container, with other dimensional ratios may be desirable, as may be determined by refrigerator surveys. In the preparation of the liner the same may be manufactured under sanitary conditions, the spout bonded thereto under like conditions, and a plain plug may be inserted in the end of the spout, which would cover the discharge orifice to maintain the sanitary condition, assuming the liner is to be subsequently filled through the open ended spout. After filling in this manner, the valve plug is inserted and thus becomes locked against removal. On the other hand the valve plug may be inserted at the time of bag manufacture to preserve sanitation, in which case filling, after prior evacuation, is effected through the discharge orifice, the valve being turned to open position for the purpose. It will be appreciated that the liner will preferably be filled when disposed within a carton, the upper end of which is open, so that the carton may provide support for the bag as it fills out into supporting relation with the inside carton walls. Filing may be effected while the spout is partly projected through the square aperture 42 of the flap 26, if desired, the flaps 26 and 28 then being in substantially closed position, or the flap 26 may be closed after filling, and after the valve head end is positioned in the aperture 42, with the tabs 108, 110, 112 and 114 on the outside and the lower flange on the inside of the flap. In either case, care is exercised to assure proper orientation of the spout within the aperture 42. Thereafter, after flaps 26 and 28 are closed, the outer flaps 30 and 32 are closed and sealed with tape as at 34 and the carton is ready for transport.

The filled package is prepared for dispensing by removing the tear out section 36, elevating the spout to lock position, and thereafter disposing the carton on one side or the other within the refrigerator in such position as is found to be most suitable. If dispensing in an inverted up-ended position, the spout may extend downward between grid wires of a supporting refrigerator shelf grid, or in a recess provided in such grid.

It is contemplated that before the contents of one package is completely dispensed, another filled package will be obtained and stored on a refrigerator shelf. The operation of preparing the package for dispensing will appear to be so readily performed, as to be capable of being exercised while the carton lies on its side on the shelf, and assuming that its position is such that the spout is located in a lower corner, the carton need not be removed from the shelf during preparation for dispensing or thereafter.

In practice, the aperture 42 in flap 26 will be located as near the corner 44 as possible, the flange of the spout attached to the bag being extremely flexible to permit such location. Thus nearly all of the contents of the package can be dispensed therefrom while lying on one of its sides or the other by reason of the discharge port being disposed at 45° from the adjacent carton walls. When a package appears empty, it may be removed, and the small quantity of milk remaining may be thrown out with the package, or for reasons of thrift, the remainder may be poured into any convenient small vessel to save the remainder from wastage, the package being light and easily handled for the purpose. On the other hand, the rear end of the pack, while lying on a side may be blocked up, or otherwise lifted to provide a tilt, so that substantially all of the contents can be drawn from the valve when up-ended.

Whether the ribs 122 and 126 will be extended the full length of the spout, in the manner of rib 128, will depend on the degree of assurance desired to prevent rotation of the spout in the aperture 42. If the ribs be wide, and the spout of lesser diameter, three ribs of full length may be preferred. The flexibility of the tabs 150 and 152 to snap through the corners of the aperture 42 may be increased by omitting the portion of the ribs 122 and 126 between the tabs and the flange 120, and severing the tabs from the remainder of the ribs along the upper surface of the tabs, as shown in FIGURE 3.

While a spout, suitable for use in an inch square aperture 42, has been referred to by way of example, it will also appear that the size may be reduced, or increased as desired, and that with the filling procedure described, rapid filling under pressure through a smaller spout, or spout discharge orifice, may be effected. From the foregoing, it will be apparent that there is provided an inexpensive molded plastic spout and valve comprising but two parts, and the entire package is one which adapts itself to single service use, that is, the package may be destroyed once it is empty. It will also appear that while reference to use in domestic refrigeration has been made, the pack is adaptable for use in special refrigerators, or any refrigerator storage unit. It will also appear that since the pack, when once its flaps are sealed, remains sealed during dispensing, any means of sealing the pack, such as gummed tape, stitching or other economical means may be employed.

It will be appreciated that the square aperture 42 cooperates with the ribs 122, 124, 126 and 128 to prevent rotation, and thus maintains the spout with its orifice disposed at 45 degrees to the side walls of the carton. The aperture 42, while shown as square in FIGURE 11, would be equally effective for this purpose, if circular with radial slots as shown in FIGURE 11a, to provide an aperture configuration, circular as at 420, and slotted as at 422, and substantially complemental to the cross sectional outline of the spout and its ribs. Such a configuration however would provide relatively loose fit whereby the tabs 108, 110, 112 and 114 of the spout can be initially projected through the aperture, and the tabs 150 and 152 subsequently sprung through the aperture. Yet the fit will be close enough to prevent rotation, and to provide support from tabs 150 and 152 when the spout is extended for dispensing. If desired, a slot 424 may be provided in the inner flap 26a, together with suitable indicia such as "3 qt." and "2 qt.," to provide a milk level sight, when the box is lying on its broad side. In such case, the tear out piece 36 may be modified in shape as in FIGURE 11a, with perforations 38a, and a cut out finger tab 40a. Also the flap 26a may be extended as at 426, and be reversely scored as at 428, so as to be capable of partially underlying flap 28, when the flaps are closed.

While a single form of the invention has been illustrated and described, it is to be understood that the invention is not limited thereto. As various changes in the construction and arrangement may be made without departing from the spirit of the invention, as will be apparent to those skilled in the art, reference will be had to the appended claims for a definition of the limits of the invention.

What is claimed is:

1. A liquid dispensing package comprising a rectangular corrugated fiber board carton having four side panels, and pairs of inside and outside end flaps for closing one end thereof, the inside end flap adjacent one corner having a square aperture with the aperture sides disposed parellel with the carton side walls adjacent said corner, and equidistant therefrom, the outside end flap adjacent said corner having a tear out section of an area greater than said aperture, and adapted when removed to provide complete access to said aperture, a flexible thin walled plastic liner bag disposed within said carton and adapted when filled to lie against the inside walls of said carton without liner stress, said liner bag having a substantially cylindrical spout integrally attached at one end to said liner bag, said spout having an internal cylindrical wall reducing in diameter centrally of its length to provide a cylindrical wall at its outer end of lesser diameter and an internal annular shoulder intermediate its length, said spout having an external flange adjacent its attachment end and quadrilaterally disposed diametrically opposed radial and lengthwise extending ribs on its exterior, the opposed outer edges of which are spaced apart by distances corresponding to the diagonal dimension of said aperture, said ribs terminating at one end in said flange, and said spout having a discharge port in its side wall in its outer end of reduced diameter and aligned with one of said ribs, and a rotatable valve plug disposed within the end of said spout, said plug having an annular outwardly extending shoulder on its inner end in engagement with said spout shoulder, to prevent removal thereof, and an aperture in its side wall adapted on rotation for alignment with said discharge port, said spout having laterally extending locking tabs associated with two opposed ribs and extending from the spout radially and angularly beyond said ribs, and toward said flange, the ends of said tabs terminating at a distance from said flange corresponding to the thickness of said inside flap.

2. A liquid dispensing package comprising a rectangular corrugated fiber board carton having four side panels, and pairs of inside and outside end flaps for closing one end thereof, the inside end flap adjacent one corner having a square aperture with the aperture sides disposed parallel with the carton side walls adjacent said corner, the outside end flap adjacent said corner having a tear out section to provide access to said aperture, a flexible thin walled plastic liner bag disposed within siad carton and adapted when filled to lie against the inside walls of said carton, said liner bag having a substantially cylindrical spout integrally attached thereto, said spout having an internal cylindrical wall reducing in diameter intermediate of its length to provide a cylindrical wall at its outer end of lesser diameter and an internal annular shoulder, said spout having an external flange adjacent the attachment end and diametrically opposed radially and lengthwise extending ribs on its exterior, the outer edges of which are spaced apart by a distance corresponding to the diagonal dimension of said aperture, said ribs terminating at one end in said flange, and said spout having a discharge port in its side wall near its outer end aligned one of said ribs, and a rotatable valve plug disposed within the end of said spout, said plug having an annular outwardly extending shoulder on its inner end in engagement with said spout shoulder, to prevent removal thereof, and an aperture in its side wall adapted on rotation for alignment with said discharge port, said spout having laterally extending resilient locking tabs extending radially and angularly therefrom, the free ends of said tabs terminating at a distance from said flange corresponding to the approximate thickness of said inside flap.

3. A liquid dispensing package comprising a rectangular corrugated fiber board carton having four side panels, and pairs of inside and outside end flaps for closing one end thereof, the inside end flap adjacent one corner having a square aperture with the aperture sides disposed parallel with the carton side walls adjacent said corner, the outside end flap adjacent said corner having a tear out section to provide access to said aperture, a flexible thin walled plastic liner bag disposed within said carton and adapted when filled to lie against the inside walls of said carton, said liner bag having a substantially cylindrical spout integrally attached thereto, said spout having an internal cylindrical wall reducing in diameter centrally of its length to provide a cylindrical wall at its outer end of lesser diameter and an internal annular shoulder, said spout having an external flange adjacent the attachment end and diametrically opposed radially and lengthwise extending ribs, on its exterior the outer edges of which are spaced apart by a distance corresponding to the diagonal dimension of said aperture, said ribs terminating at one end in said flange, and said spout having a discharge port in its side wall near its outer end aligned with one of said ribs, and a rotatable valve plug disposed within the end of said spout, said plug having an annular outwardly extending shoulder on its inner end in engagement with said spout shoulder, to prevent removal thereof, and a side wall aperture for alignment with said port on rotation of the plug.

4. A valve spout for a liner bag adapted to be supported in a carton, comprising a tubular body member, said body member having an internal cylindrical wall portion extending inwardly from one end and terminating intermediate the length of the member in an abrupt increase in diameter to provide an annular shoulder, said member having a radial discharge port intermediate the length of said wall, and a hollow valve plug closed at one end, and having a flange engaging the end of said body member, said plug having an external cylindrical wall disposed in substantially complemental relation to said cylindrical internal body member wall, and terminating in an annular shoulder of larger diameter than said internal wall and seated beneath said first named shoulder, said plug having a radial aperture adapted for alignment with said port on rotation of said plug, and at least one of said plug and body member being resilient whereby the annular shoulder of the plug may be assembled by insertion through the cylindrical wall portion of said body member to bring said annular shoulders into position for preventing disassembly and to hold said port and aperture in axial alignment.

5. A valve spout in accordance with claim 4 wherein the external cylindrical wall of the plug is provided with annular sealing beads on either side of the plug aperture.

6. A valve spout in accordance with claim 4 wherein the body member end is provided with an arcuate recess, and the flange of the plug is provided with a key extending into said recess, whereby to limit rotation of the plug within the body member.

7. A valve spout in accordance with claim 4 wherein the tubular body member is provided with an external flange adjacent its other end, and a plurality of lengthwise extending ribs, disposed about the member, and wherein the outer edges of said ribs are parallel and define the corners of a polygon.

8. A valve spout in accordance with claim 4 wherein the external cylindrical wall of the plug is provided with annular sealing beads on either side of the plug aperture, and wherein the body member has an external lengthwise extending rib extending to the said end thereof, said rib having lengthwise extending stress relief apertures therein extending across the planes of said sealing beads.

9. A valve spout in accordance with claim 4 wherein the tubular body member is provided with an external flange adjacent its other end, and a plurality of lengthwise extending ribs disposed about the member and wherein the outer edges of said ribs are parallel, and define the corners of a polygon, and wherein the closed end of the plug valve is provided with projecting tabs lying in a plane transverse to the axis of the plug and in which said tabs define an area greater than the polygon defined by said ribs.

References Cited by the Examiner
UNITED STATES PATENTS

| | | | |
|---|---|---|---|
| 801,647 | 10/1905 | Chadwick | 222—553 X |
| 1,725,689 | 8/1929 | Wilt | 222—553 |
| 3,042,271 | 7/1962 | Winstead | 222—183 X |
| 3,173,579 | 3/1965 | Curie et al. | 222—183 X |

LOUIS J. DEMBO, *Primary Examiner.*

CHARLES R. CARTER, *Examiner.*